(12) United States Patent
Doshi et al.

(10) Patent No.: US 8,850,252 B2
(45) Date of Patent: Sep. 30, 2014

(54) USB HOST WAKE FROM SLEEP STATE FOR MOBILE DEVICES

(75) Inventors: Hemalkumar Chandrkant Doshi, Sunnyvale, CA (US); Rajkumar Jayaraman, San Jose, CA (US); Seshendra Gadagottu, Hyderabad (IN); Narendra Damahe, Bothell, WA (US)

(73) Assignee: Nvidia Corporation, Santa Clara, CA (US)

(*) Notice: Subject to any disclaimer, the term of this patent is extended or adjusted under 35 U.S.C. 154(b) by 280 days.

(21) Appl. No.: 13/288,355

(22) Filed: Nov. 3, 2011

(65) Prior Publication Data

US 2013/0117489 A1    May 9, 2013

(51) Int. Cl.
*G06F 1/32*    (2006.01)
*G06F 1/00*    (2006.01)
*G06F 3/00*    (2006.01)
*G06F 13/20*   (2006.01)

(52) U.S. Cl.
CPC .................................. *G06F 13/20* (2013.01)
USPC ............. 713/323; 713/320; 713/322; 710/10

(58) Field of Classification Search
USPC .................. 713/300–320, 322–324; 719/321; 710/8–10, 14, 104
See application file for complete search history.

(56) References Cited

U.S. PATENT DOCUMENTS

| 2007/0005824 A1* | 1/2007 | Howard | 710/18 |
| 2008/0005446 A1* | 1/2008 | Frantz et al. | 710/313 |
| 2009/0111524 A1* | 4/2009 | Basaralu | 455/559 |
| 2011/0161711 A1* | 6/2011 | Takamoto | 713/324 |
| 2012/0084592 A1* | 4/2012 | Lin et al. | 713/324 |
| 2013/0290760 A1* | 10/2013 | Cooper et al. | 713/323 |

OTHER PUBLICATIONS

"Intel® I/O Controller Hub 10 (ICH10) Family". Oct. 2008. Intel Corporation. Document No. 319973-003.*
"Universal Host Controller Interface (UHCI) Design Guide". Revision 1.1. Mar. 1996. Intel Corporation.*
"Low Power Function of Mobile RAM Partial Array Self Refresh (PASR)". Version 1.0. Nov. 2005. Elpida Memory, Inc. Document No. E0697E10.*
Stern, Alan. "USB device peristence during system suspend". Online Feb. 25, 2008. Retrieved from Internet Dec. 3, 2013. <http://www.cs.fsu.edu/~baker/devices/lxr/http/source/linux/Documentation/usb/persist.txt>.*
"Universal Serial Bus Specification". Revision 2.0. Apr. 27, 2000. Compaq Computer Corporation et al.*
Power Management of US Host Controllers, Microsoft Corporation, Aug. 30, 2004, p. 8.

* cited by examiner

*Primary Examiner* — Thomas J Cleary

(57) ABSTRACT

A USB host for wakeup from a sleep state includes a hold memory, a USB host controller, and a USB driver. When going to sleep, the USB driver sends a suspend command to the USB host controller in response to receiving a sleep command. The USB driver also reads a controller context from the USB host controller and saves the controller context in the hold memory. Thereafter, the USB driver turns off one or more supply potentials and one or more clocks in the host controller, and returns a sleep acknowledgement. While in sleep, the interface pins are placed in a hold state and notification to the operating system are disabled.

17 Claims, 3 Drawing Sheets

USB HOST WAKE FROM SLEEP STATE FOR MOBILE DEVICES

BACKGROUND OF THE INVENTION

Computing devices, have made significant contributions toward the advancement of modern society and are utilized in a number of applications to achieve advantageous results. Numerous devices, such as personal computers, servers, hand-held devices, distributed computer systems, calculators, audio devices, video equipment, and telephone systems, have facilitated increased productivity and reduced costs in analyzing and communicating data in most areas of business, science, education and entertainment.

Mobile computing devices such as laptop personal computers, tablet personal computers, netbooks, smart phones and the like further enable increased productivity. However, the tradeoff between power consumption and responsiveness of the mobile computing device provide additional challenges. Deep sleep is an important feature in mobile devices as it allows the processor to reduce power consumption when the mobile device is not actively being used. During this mode, power to a substantial portion (typically >99%) of the processor is turned off. Only a small portion of the processor is kept on which can be used to wake up the rest of the processor from deep sleep.

As the power to most of the mobile processor (applications processor) is turned off during deep sleep, those portions get a reset on wake up from deep sleep. The USB controllers and transceivers on the mobile processor also get a reset. Since they are getting reset, they don't have knowledge of any device connected to downstream before the system went to deep sleep. Hence the downstream devices need to be discovered/detected again and a complete re-enumeration needs to be done before we can start using the device again.

Hence, on wake-up from deep sleep, a USB host EHCI controller will start the enumeration of the connected device by resetting the USB bus. This enumeration process typically takes 1-2 seconds and after identifying the connected device, a relevant class driver will be loaded. This adds a significant delay to a wake event for mobile devices. This is particularly troublesome if a modem is connected on the USB. The OS takes a long time to reload the device drivers and that adds to the delay. This could be a problem if, for example, the user receives a call while his or her smartphone is in deep sleep. In addition, some devices aren't friendly with this kind of re-enumeration with respect to deep sleep operation and wakeup thereafter.

To avoid this delay, it would be beneficial to keep the USB controller on during sleep mode. However, in sleep mode the power to the USB controller is turned off and therefore cannot be placed in sleep mode. Accordingly, there is a continued need for improved techniques for waking-up a USB port from deep sleep.

SUMMARY OF THE INVENTION

The present technology may best be understood by referring to the following description and accompanying drawings that are used to illustrate embodiments of the present technology for USB host wakeup from a sleep state.

In one embodiment, a method includes receiving, by a USB driver, a sleep command. In response to receiving the sleep command, the USB driver, sends a suspend command to a USB host controller. The USB driver also reads a controller context from the USB host controller and stores the controller context in a hold memory. Thereafter, the USB driver turns the power and the clock in the USB host controller Wand returns a sleep acknowledgement. As a result, the USB host is placed in a sleep mode. In response to receiving a resume command, the USB driver turns the power and the clock in the USB host controller on. The USB driver also reads the stored controller context in the hold memory and restores the controller context to the USB host controller. The USB driver then waits until a current connection status and port enable are set to a given state, before a suspend command to the USB host controller. Once the USB host controller is suspended, the USB driver clears interrupts and enables notifications. The USB driver then sends a resume command to the USB host controller and returns a resume acknowledgement.

In another embodiment, a system includes a means for receiving a sleep command. A means for sending a suspend communication on a USB bus command in response to receiving the sleep command is also included. A means for reading a controller context in response to receiving the sleep command, and a means for storing the controller context is further included. A means for turning off one or more USB supply potentials and one or more USB clocks after storing the controller context is also included. A means for returning a sleep acknowledgement in response to turning off the one or more USB supply potential and the one or more USB clocks is also included to implement a technique for going into a sleep mode. To resume from sleep mode the system includes a means for receiving a resume command. A means for turning on the one or more USB supply potential and the one or more USB clocks in response to receiving the resume command is also included. A means for reading the stored controller context in response to receiving the resume command, and a means for restoring the stored controller context if further included. The system also includes a means for waiting until a current connection state and a port enable are set to a given state after restoring the controller context. A means for sending a suspend communication on the USB bus command when the current connection state and part enable are set to the given state is also included. A means for clearing interrupts after sending the suspend communication on the USB bus command and a means for enabling notifications after sending the suspend communication on the USB bus command is further included. A means for sending a resume communication on the USB bus command after clearing interrupts and enabling notifications and a means for returning a resume acknowledgement after sending the resume communication on the USB bus command is also included to implement the technique for resuming from the sleep mode.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
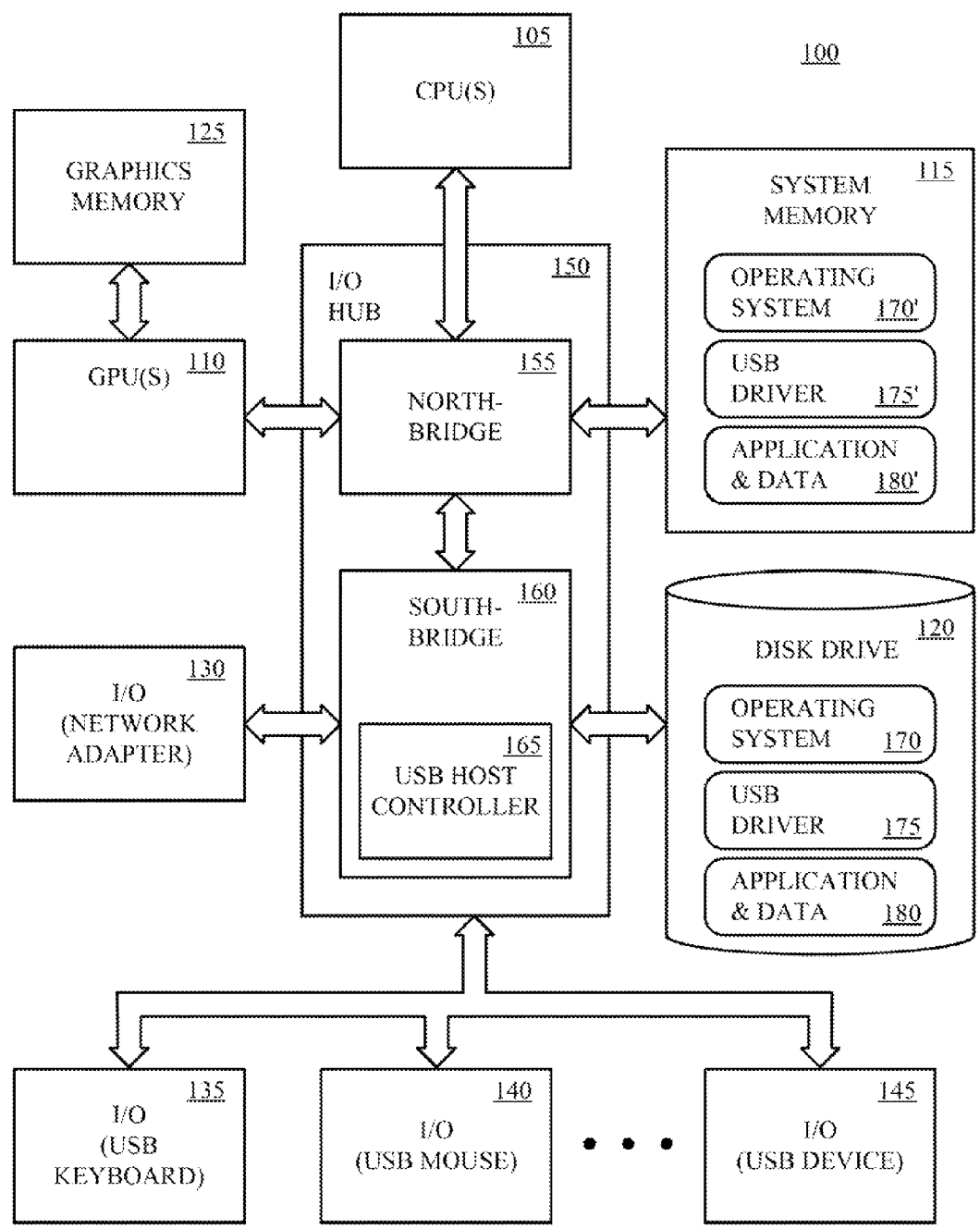
FIG. 1 shows a block diagram of an exemplary computing device for implementing embodiments of the present invention.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

Referring to FIG. 1, an exemplary computing device 100 for implementing embodiments of the present invention is shown. The computing device 100 may be a laptop personal computer, a tablet personal computer, a netbook, a smart phone, or the like mobile computing device. The computing device 100 includes one or more processors 105, 110, one or more computing device-readable media 115, 120, 125, one or more input/output (I/O) devices 130, 135, 140, 145, and one or more input/output hubs 150, 155, 160 communicatively coupled together by one or more communication buses. The processor 105, 110 may include one or more general purpose processors, such as a central processing unit (CPU 105), and one or more specialized processors, such as a graphics processing unit (GPU) 110. The I/O device 130, 135, 140, 145 may include a network adapter (e.g., Ethernet card), CD drive, DVD drive and/or the like, and peripherals such as a keyboard, a pointing device, a speaker, a printer, and/or the like. In one implementation, the one or more input/output hubs 150 include a chipset, such as a northbridge 155 and southbridge 160. The northbridge 155 provides for communication with the processor 105 and interaction with the system memory 115. The southbridge 160 provides for input/output functions, including a USB host controller 165.

The computing device-readable media 115, 120, 125 may be characterized as primary memory and secondary memory. Generally, the secondary memory, such as a magnetic and/or optical storage, provides for non-volatile storage of computer-readable instructions and data for use by the computing device 100. For instance, the disk drive 120 may store the operating system (OS) 170, one or more utilities and software drivers including a USB driver 175, and various applications and data 180. The primary memory, such as the system memory 115 and/or graphics memory 125, provides for volatile storage of computer-readable instructions and data for use by the computing device 100. For instance, the system memory 115 may temporarily store a portion of the operating system 170', portions of one or more utilities and software drivers including a USB driver 175', and a portion of one or more applications and associated data 180' that are currently used by the CPU 105, GPU 110 and the like. It is also appreciated that one or more elements of the computing device, such as the I/O hub 150, may include specialized computing device-readable media such as non-volatile flash memory and/or read only memory (ROM), and/or volatile random access memory.

The USB driver 175 and USB host controller 165 operate in accordance with the well-known in the art Universal Serial Bus Specification standard. The well-known conventional aspects of the USB driver and USB controller will not be further explained herein except as they related to the USB host wake from sleep state techniques, in accordance with embodiments of the present technology, described below.

Figure 2:
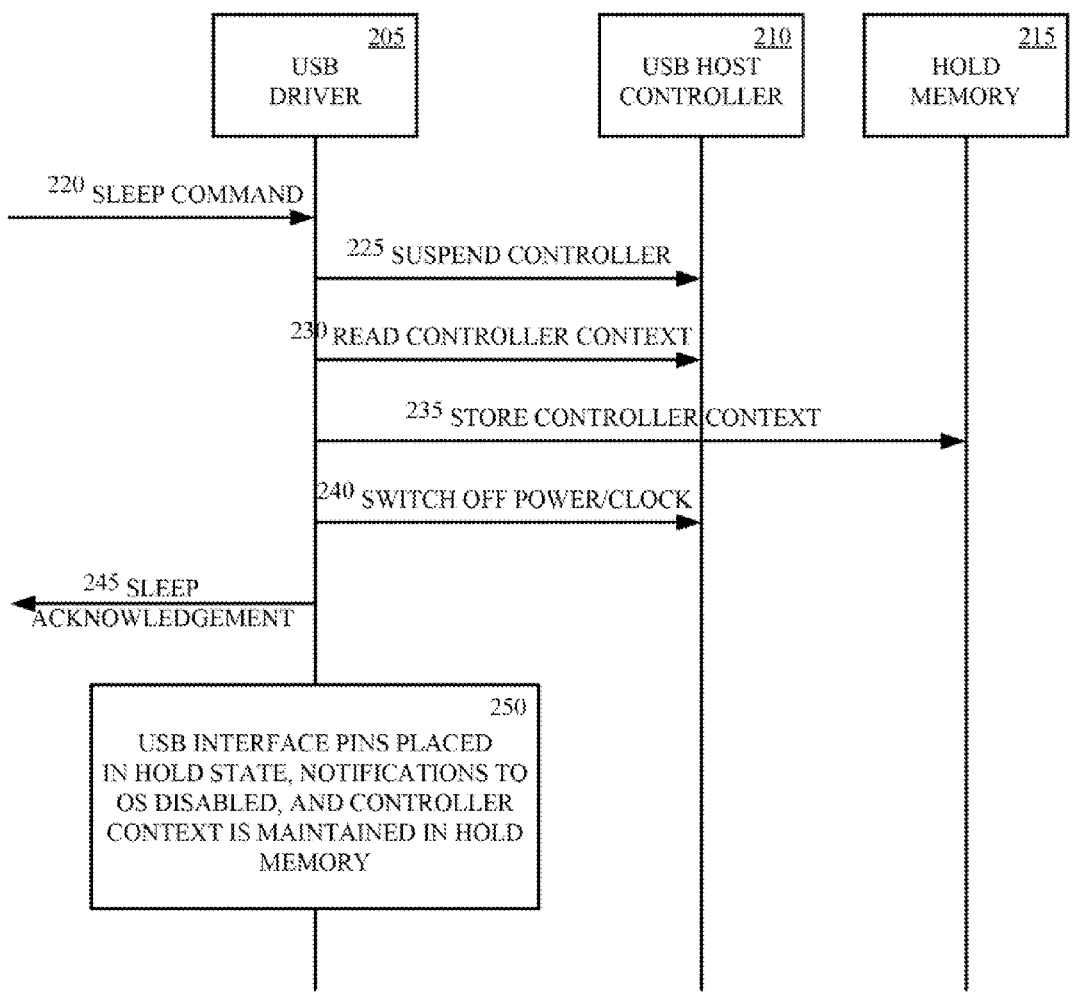
FIG. 2 shows a flow diagram of a method of placing a universal serial bus of a computing device in sleep mode for wakeup, in accordance with one embodiment of the present technology.

Referring now to FIG. 2, a method of placing a universal serial bus of a computing device in sleep mode for wakeup, in accordance with one embodiment of the present technology, is shown. The method may be implemented in a combination of software and hardware, a combination of software and firmware, or a combination of software, firmware and hardware. As used herein, software includes computing device-executable instructions (e.g., computer program) that are stored in computing device-readable media (e.g., computer memory) and executed by a computing device (e.g., processor). Firmware includes computing device-executable instructions (e.g., computer program) that are stored in hardware and executed by a computing device (e.g., processor). Typically, the USB driver 205 is implemented in software. The USB host controller 210 is typically implemented in firmware and/or hardware. Although other combination for implementing the USB driver 205 and USB host controller 210 are included herein.

The method begins with the USB driver 205 receiving a sleep command, at 220. In one implementation, the USB driver 205 receives a sleep command from the operating system 165 of the computing device 100. At 225, the USB driver 205 sends a suspend instruction to the USB host controller 210 to cause the USB host controller 210 to suspend communication on the USB bus. The software driver 205 sends the suspend instruction to the USB host controller 210 in response to receipt of the sleep instruction. In one implementation, the USB host controller 210 suspends communication on the USB bus by putting the USB interface pins in a hold state. The USB interface pins may be put in a hold state by driving the USB interface pins into a high impedance state. Keeping the USB interface pins in a hold state places and keeps downstream USB device coupled to the USB bus in a hold state.

At 230, the USB driver 205 reads the controller context of the USB host controller 210. The USB driver 205 reads the controller context of the USB host controller 210 in response to receipt of the sleep instruction. In one implementation, the controller context includes Enhanced Host Controller Interface (EHCI) data. The EHCI data may include a speed mode parameter and a port power parameter. At 235, the USB driver stores the controller context in a hold memory 215. In one implementation, the hold memory may be computing device readable media such as a non-volatile flash memory of the input/output hub 150. In another implementation, the hold memory may be self-refresh mode SDRAM of the system memory 115. In yet another implementation, the hold memory may be non-volatile memory such as disk drive 120.

At 240, the USB driver 205 sends a power off instruction and a clock off instruction to the USB host controller 210 to turn one or more power supplies (e.g., supply potential) off and one or more clocks off in the USB host controller 210. The USB driver 205 sends a power off instruction and a clock off instruction to the USB host controller 210 after storing the controller context. Switching off the power and clock in the USB host controller 210 saves power when in the sleep mode. At 245, the USB driver 205 returns a sleep acknowledgement. The USB driver 205 returns a sleep acknowledgement after sending the power off control signal and the clock off control signal to the USB host controller 210. In one implementation, the USB driver 205 may wait for a predetermined time or wait for a signal from the USB host controller 210 or associated hardware to indicate that the power and clock have been turned off before sending the sleep acknowledgement to the operating system 165 of the device 100. At 250, the USB interface pins are in a hold state, notification to the operating system is suspended, and the controller context is maintained in the hold memory. In sleep mode any indication of a reset, re-enumeration or the like from the operating system is held off so that the operating system does not try to re-load any drivers. From the operating system context, the USB is in a suspend or sleep mode.

Figure 3:
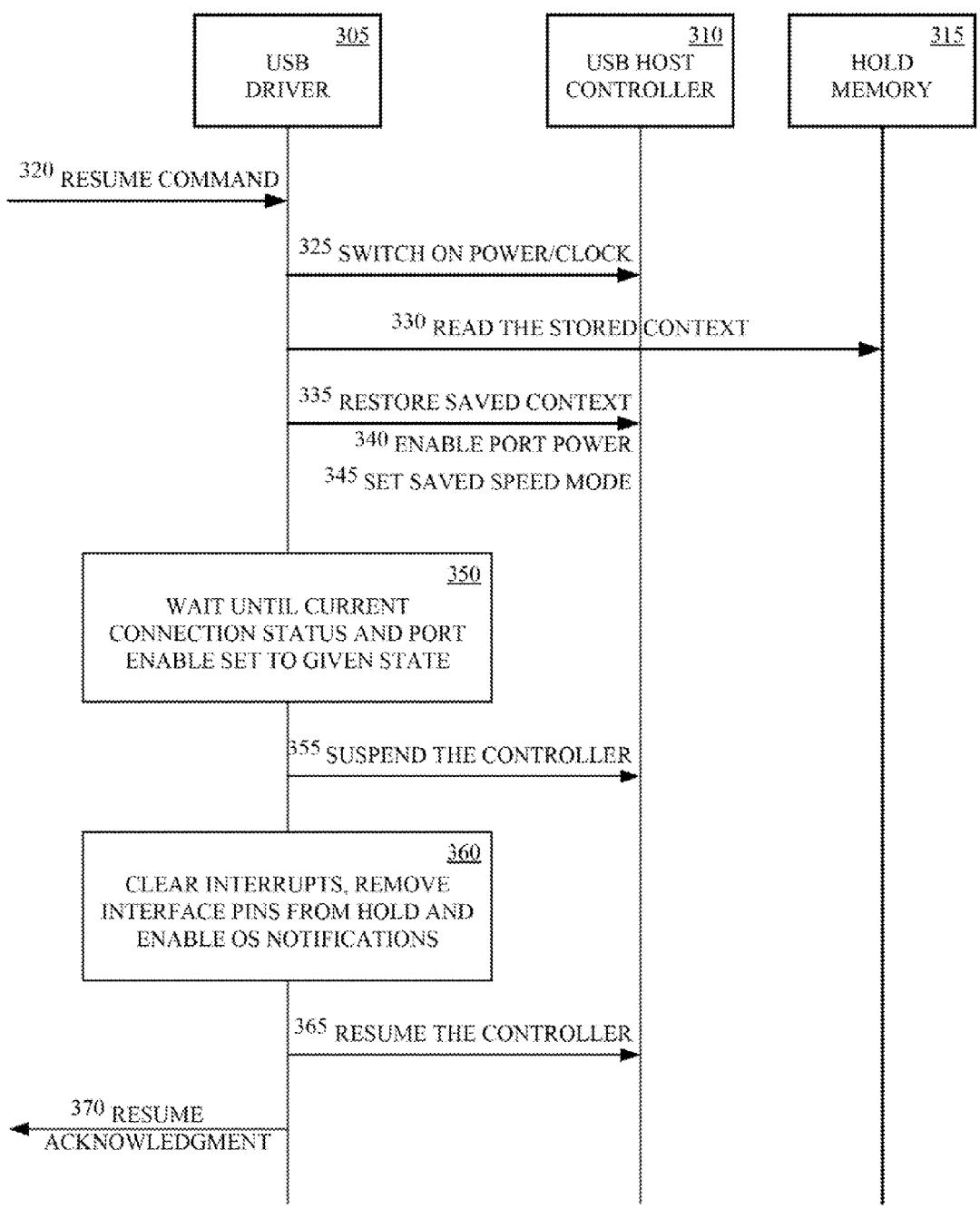
FIG. 3 shows a flow diagram of a method of returning a universal serial bus of a computing device from sleep mode for wakeup, in accordance with one embodiment of the present technology.

Referring now to FIG. 3, a method of returning a universal serial bus of a computing device from sleep mode for wakeup, in accordance with one embodiment of the present technology, is shown. Again, the method may be implemented in a combination of software and hardware, a combination of software and firmware, or a combination of software, firmware and hardware. The method begins with the USB driver 305 receiving a resume instruction, at 320. In one implementation, the USB driver 305 receives a resume command from the operating system 165 of the computing device 100. At 325, the USB driver 305 sends a power on instruction and a clock on instruction to the USB host controller 310 to turn the one or more power supplies (e.g., supply potential) on and the one or more clocks on in the USB host controller 310. The USB driver 305 sends the power on instruction and the clock on instruction to the USB host controller 310 in response to receipt of the resume command.

At 330, the USB driver 305 reads the stored controller context from the hold memory 315. Again, the controller context in one implementation includes EHCI data. The EHCI data may include a speed mode parameter and a port power parameter. The USB driver 305 reads the stored context from the hold memory 315 in response to receipt of the resume command. At 335, the USB driver 305 restores the controller context to the USB host controller 310. Restoring the controller context includes enabling the port power, at 340. Restoring the controller context also includes setting the speed mode, at 345. The USB driver 305 restores the controller context to the USB host controller 310 after sending the power on control signal and the clock on control signal to the USB host controller 310.

At 350, the USB driver 305 waits until the current connection status and port enable are set to a given state. In one implementation, the USB driver 305 waits until the Current Connect Status (CCS) and Port Enabled (PE) bits of the PORTSC register in the USB host controller 310 are set to 1 (e.g., logic high). At 355, the USB driver 305 sends a suspend instruction to the USB host controller 310. In one implementation, the USB host controller 310 suspends communication on the USB bus by putting the USB interface pins in a hold state. The USB driver 305 sends the suspend instruction to the USB host controller 310 in response to current connection status and port enable being set to the given state.

At 360, the USB driver 305 clears any interrupts, removes the USB interface from the hold state, and enables notifications to the operating system. At 365, the USB driver 305 sends a resume instruction to the USB host controller 310. The USB driver 305 sends the resume instruction to the USB host controller 310 after clearing any interrupts and enabling notifications to the operating systems. At 370, the USB driver 305 returns a resume acknowledgement. In one implementation, the USB driver returns the resume acknowledgement to the operating system 165 of the computing device 100. Thereafter, control is passed to the operating system to permit communication with downstream devices in accordance with the USB standard.

Embodiments of the present technology advantageously hold off operating system discovery of downstream device (e.g., enumeration) and reloading of device drivers when waking up from sleep mode. While the operating system is held off, the USB controller is practically fooled into thinking downstream devices are connected and is suspended without actually exposing the physical connection of the downstream devices to the USB controller hardware. Accordingly, the USB controller can start communicating with downstream devices without the need for any re-enumeration. Embodiments of the present technology therefore enable faster wake-up from deep sleep than re-enumeration based techniques, while also saving power during the deep sleep mode.

Embodiments of the present technology are particularly advantageous for use in mobile devices having fixed down stream devices. Such a fixed downstream device could, for example, be a modem or USB hub with additional parts, a composite USB hub with some downstream ports and some built-in peripheral such as a modem or a card reader, or the like. Embodiments of the present technology can advantageously be applied to different configurations of the USB controller and transceiver interface, including but not limited to, internal transceivers using USB Transceiver Macro Cell Interface (UTMI+) and physical layer (PHY) for cabled USB ports, internal transceivers using High Speed Inter-Chip USB (HSIC) PHY for HSIC interfaces, internal transceivers using Interchip (ICUSB) PHY for HSIC interfaces, external transceivers using UTMI+ Low Pin Interface (ULPI) PHY, and any new interfaces that may be added in the future.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A method comprising:
   receiving, by a USB driver, a sleep command;
   sending, from the USB driver, a suspend command to a USB host controller;
   reading, by the USB driver, a controller context from the USB host controller;
   storing, by the USB driver, the controller context in a hold memory;
   turning, by the USB driver, off power and a clock in the USB host controller; and
   returning, by the USB driver, a sleep acknowledgement.

2. The method of claim 1, wherein the sleep command is received by the USB driver from an operating system.

3. The method of claim 1, further comprising putting, by the USB host controller, USB interface pins in a hold state.

4. The method of claim 1, wherein the controller context includes a speed mode parameter and a port power parameter.

5. The method of claim 1, wherein the sleep acknowledgement is returned by the USB driver to an operating system.

6. The method of claim 1, wherein the USB host controller is suspended, notifications from an operating system are suspended, and the controller context is maintained in the hold memory during a sleep mode after the power and clock of the USB host controller is turned off.

7. The method of claim 1, further comprising:
   receiving, by the USB driver, a resume command;
   turning, by the USB driver, on power and a clock in the USB host controller;
   reading, by the USB driver, the stored controller context in the hold memory;
   restoring, by the USB driver, the stored controller context to the USB host controller;
   waiting, by the USB driver, until a current connection status and port enable are set to a given state;
   sending, from the USB driver, a suspend command to the USB host controller;
   clearing, by the USB driver, an interrupt;
   enabling, by the USB driver, a notification;
   sending, by the USB driver, a resume command to the USB host controller; and
   returning, by the USB driver, a resume acknowledgement.

8. A system comprising:
   a hold memory;
   a USB host controller; and
   a USB driver to receive a sleep command, to send a suspend command to the USB host controller, to read a controller context from the USB host controller, to save the controller context in the hold memory, to turn off one or more supply potentials and one or more clocks in the host controller and to return a sleep acknowledgement.

9. The system according to claim 8, further comprising the USB driver to receive a resume command, turn on the one or more supply potential and one or more clock in the host controller, to read the stored controller context in the hold memory, to restore the stored controller context to the USB host controller, to wait until a current connection status and port enable of the USB host controller are set to a given state, to send a suspend command to the USB host controller, to clear interrupts and enable notifications, to send a resume command to the USB host controller and to return a resume acknowledgement.

10. The system according to claim 9, further comprising the USB host controller to put USB interface pins in a hold state in response to the suspend command.

11. The system according to claim 10, further comprising the USB host controller to remove USB interface pins from the hold state in response to the resume command.

12. The system according to claim 11, wherein the controller context includes a speed mode parameter and a port power parameter.

13. The system according to claim 8, wherein the hold memory comprises a self-refresh mode random access memory.

14. The system comprising:
   a means for receiving a sleep command;
   a means for sending a suspend communication on a USB bus command in response to receiving the sleep command;
   a means for reading a controller context in response to receiving the sleep command;
   a means for storing the controller context;
   a means for turning off one or more USB supply potentials and one or more USB clocks after storing the controller context;
   a means for returning a sleep acknowledgement in response to turning off the one or more USB supply potential and the one or more USB clocks.

15. The system according to claim 14, further comprising:
   a means for receiving a resume command;
   a means for holding off operating system discovery of a downstream device and reloading of a device driver, including;
   a means for turning on the one or more USB supply potential and the one or more USB clocks in response to receiving the resume command;
   a means for reading the stored controller context in response to receiving the resume command;
   a means for restoring the stored controller context;
   a means for waiting until a current connection state and a port enable are set to a given state after restoring the controller context;
   a means for sending a suspend communication on the USB bus command when the current connection state and part enable are set to the given state;
   a means for clearing interrupts after sending the suspend communication on the USB bus command;
   a means for enabling notifications after sending the suspend communication on the USB bus command; and
   a means for sending a resume communication on the USB bus command after clearing interrupts and enabling notifications; and
   a means for returning a resume acknowledgement after sending the resume communication on the USB bus command.

16. The system according to claim 15, wherein the controller context includes a speed mode parameter.

17. The system according to claim 15, wherein the controller context includes a power port parameter.

* * * * *